May 26, 1970  R. NEWSTEDER  3,513,978
EXTERNAL WATER TREATING DEVICE FOR AQUARIA
Filed May 27, 1968  4 Sheets-Sheet 1

INVENTOR:
ROBERT NEWSTEDER
BY Robert Henderson
ATTORNEY

INVENTOR:
ROBERT NEWSTEDER
BY Robert Henderson
ATTORNEY

INVENTOR:
ROBERT NEWSTEDER
BY Robert Henderson
ATTORNEY

United States Patent Office 3,513,978
Patented May 26, 1970

3,513,978
EXTERNAL WATER TREATING DEVICE
FOR AQUARIA
Robert Newsteder, 5 Valley Way,
West Orange, N.J. 07052
Filed May 27, 1968, Ser. No. 732,293
Int. Cl. E04h 3/20
U.S. Cl. 210—169                     6 Claims

ABSTRACT OF THE DISCLOSURE

A relatively flat, tri-compartmented tank, mounted upon the outside of an upright wall of an aquarium, provides for approximately horizontal flow of water between the tank's compartments and into and from perforate broad faces of adjacent, separately removable, upright, relatively thin boxes containing different water treating materials and fitted, in side-by-side relationship, into one of the tank's compartments. One of these boxes includes a sediment receptacle; and another compartment of the tank is fitted, for aeration purposes, with a readily removable assembly including an air bubble emitting porous stone positioned directly below a conical bubble receiving canopy to which the stone is connected by a group of upright fingers.

BACKGROUND OF THE INVENTION

Water treating means for aquaria have hitherto been provided for mounting as a whole or in part, outside of the aquarium tank. All of these prior water treating means suffer one or more of the following disadvantages:

(1) only partial treatment of the water
(2) inefficient filtering
(3) difficulty of replacing used-up filtering media
(4) disturbance of the contents of the aquarium tank
(5) complicated and costly filter elements
(6) substantial separation of various water treating components

THE IMPROVEMENT FEATURES, GENERALLY, OF THIS INVENTION

The present invention, as generalized in the foregoing abstract, substantially overcomes the previously enumerated disadvantages. Somewhat more specifically, this invention contemplates the provision of a unitary, relatively small (as compared to the aquarium tank) water treating flow tank having a water receiving compartment which, by means of a syphonal tube, receives water from the aquarium tank, a filtering-purifying compartment, which at one side thereof receives a vertical sheet of water moving horizontally through a narrow, vertical passage from the water receiving compartment, and a water aerating compartment which receives a vertical sheet of filtered and purified water moving horizontally from the other side of the filtering-purifying compartment.

The filtering-purifying compartment has two separate, relatively broad and thin, readily removable and replaceable perforate, containers fitted thereinto in vertical, side-by-side positions, the flowing water being constrained to pass, broad-side, through a first of said containers filled with suitable fibrous filtering materials, and then, broad-side, through a second of said containers filled with charcoal particles. Said first container includes a sediment receptacle, positioned at the lower part of its front side, in position to receive solids gravitating from water received from said water receiving compartment. Said containers are merely lifted out, for servicing, and then re-inserted without disturbing any other parts of the device.

The aerating compartment has an improved, readily removable, air bubbling assembly therein including a tube which conveys air bubbles and water entrained thereby, from the aerating compartment to the aquarium tank.

THE DRAWING

In the drawing:
FIG. 1 is a perspective view of an improved water treating device according to a preferred embodiment of this invention, several parts thereof being partly broken away to disclose underlying characteristics, particularly of containers in the device for holding water treating materials; said materials, however, being omitted for clearness of illustration.

DETAILS OF THE ILLUSTRATED DEVICE

Figure 1:
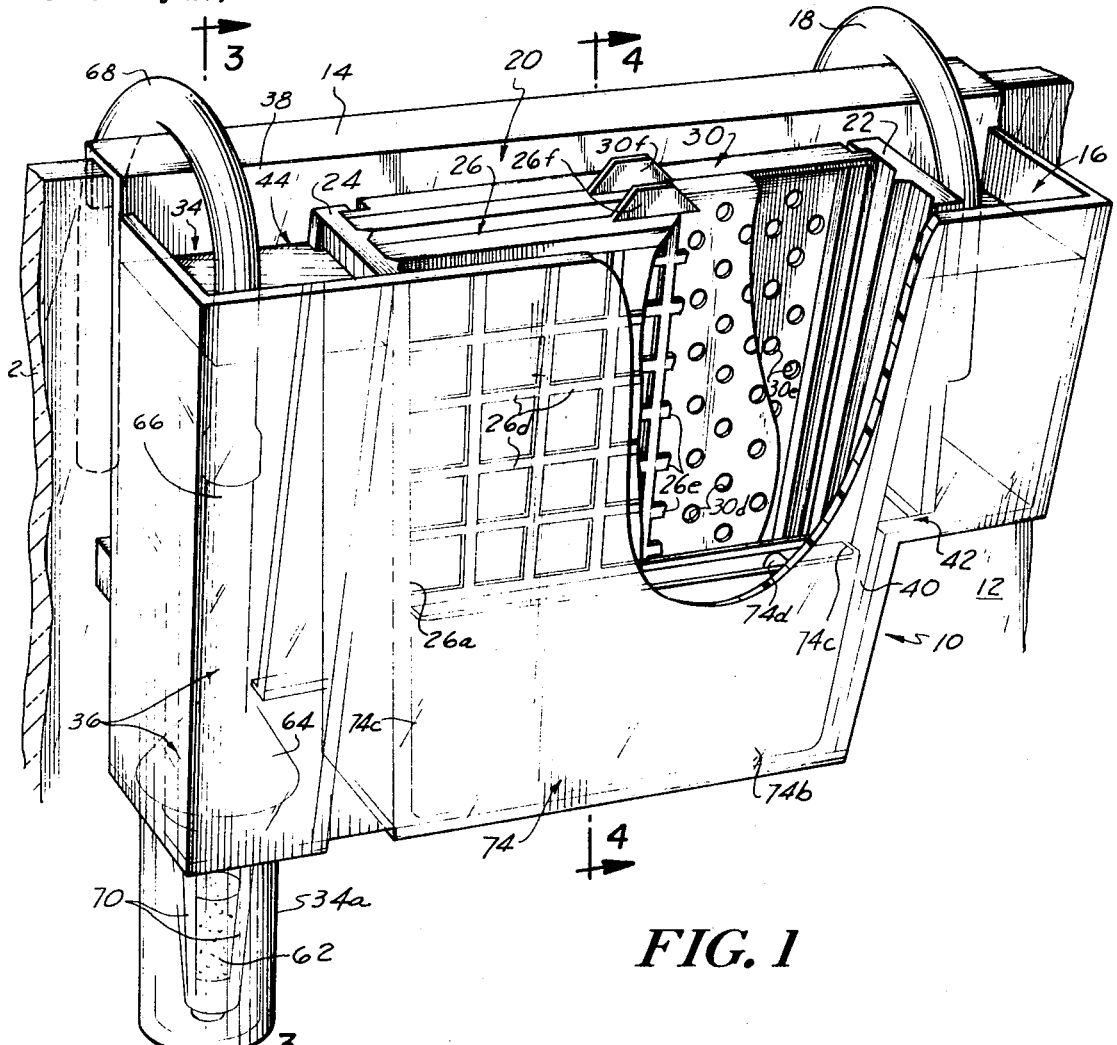

The device shown in the drawing is presented for illustrative purposes without limiting this invention specifically thereto.

Figure 2:
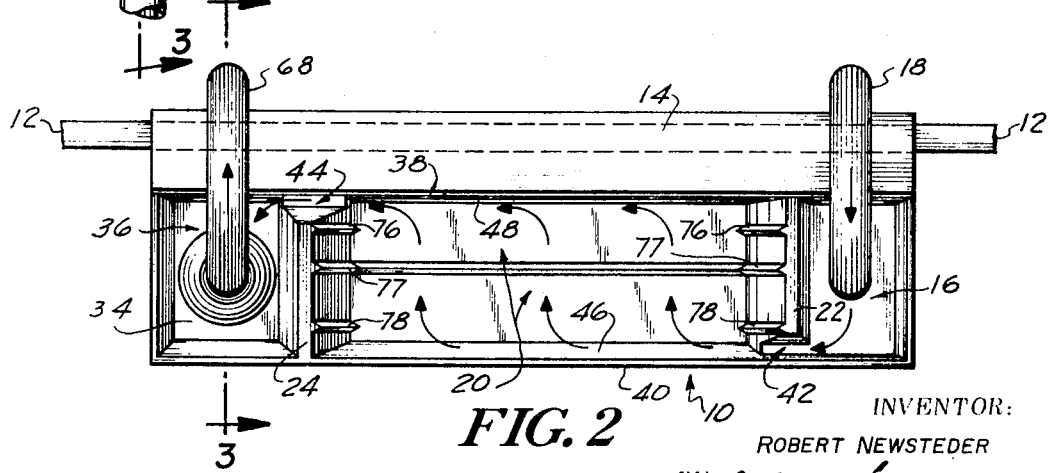
FIG. 2 is a top plan view of said device, from which, however, the mentioned containers have been omitted.
Figure 3:
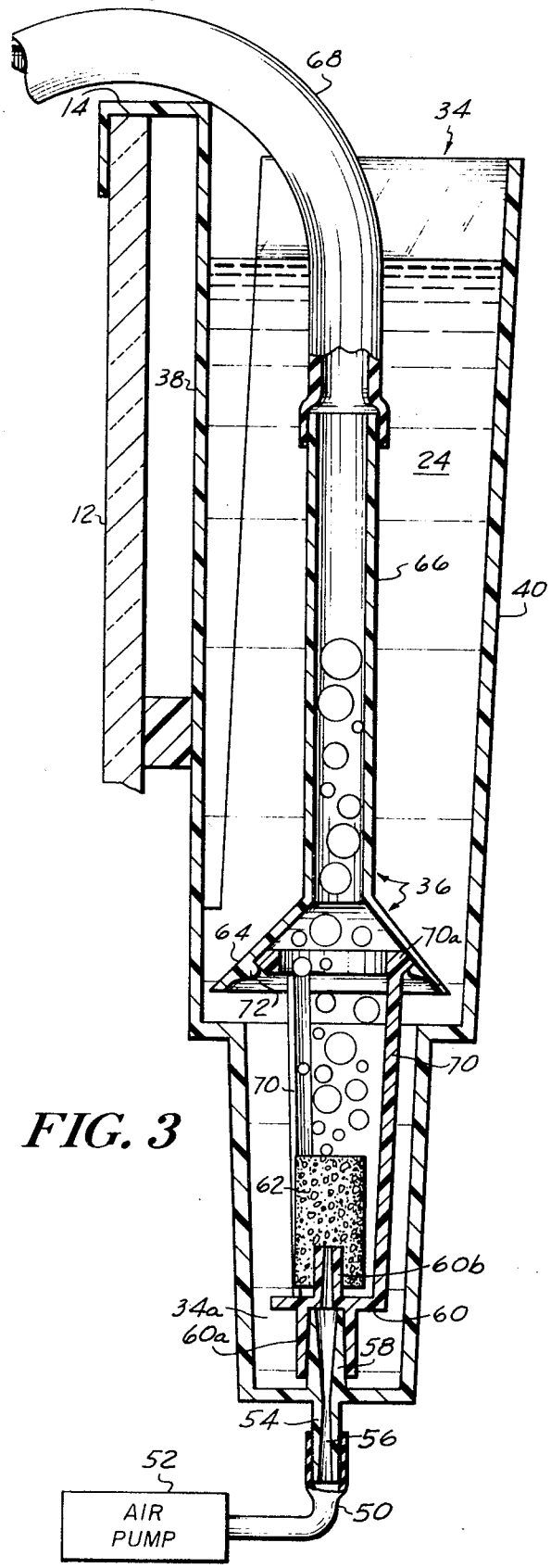
FIG. 3 is a vertical, sectional view, substantially on the lines 3—3 of FIGS. 1 and 2.

As may best be understood from FIGS. 1 and 2, the illustrated device comprises an irregularly shaped water treating tank 10, conveniently mounted upon a glass wall 12 of an aquarium by an integral, inverted channel member 14 which is hooked upon the upper margin of the wall 12. The tank 10 may advantageously be of molded relatively rigid, plastic material which is shown as clear material to facilitate illustration.

Figure 4:
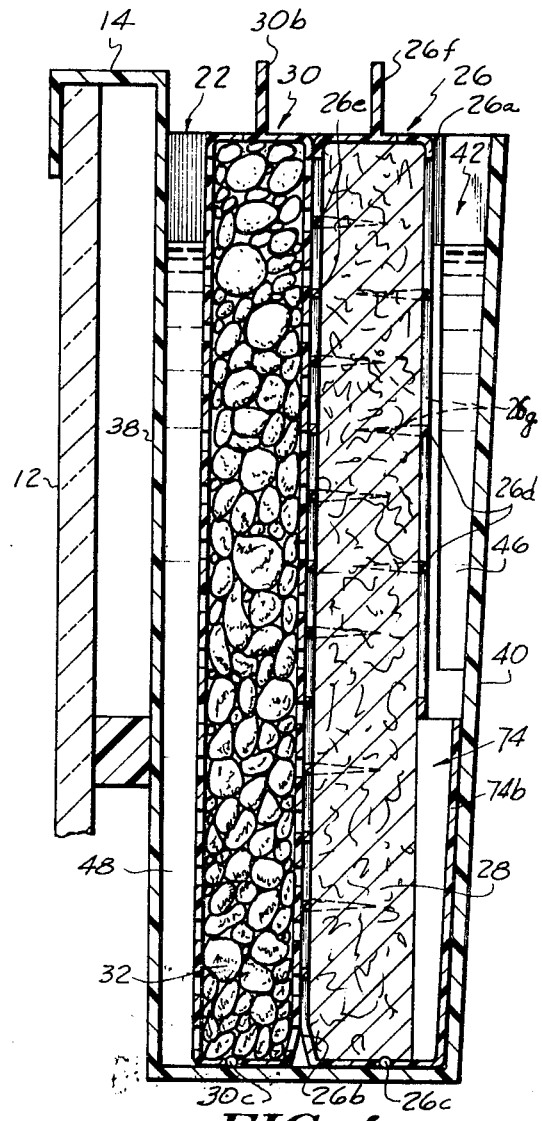
FIG. 4 is a vertical, sectional view, substantially on the line 4—4 of FIG. 1; the water treating materials being shown in their containers.
Figure 7:
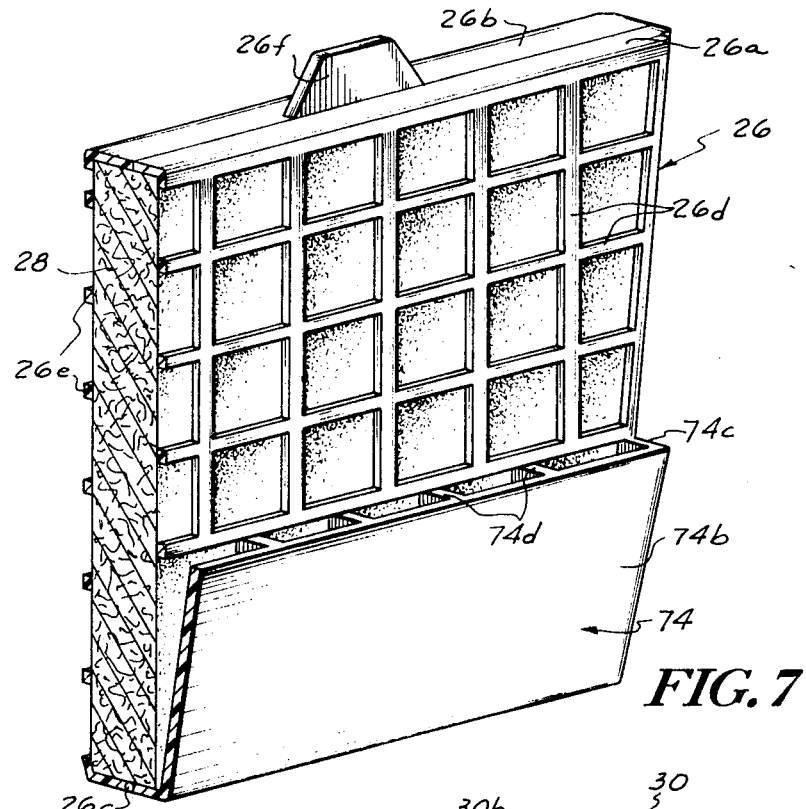
FIG. 7 is a perspective view of a large fragment of said first container.
Figure 8:
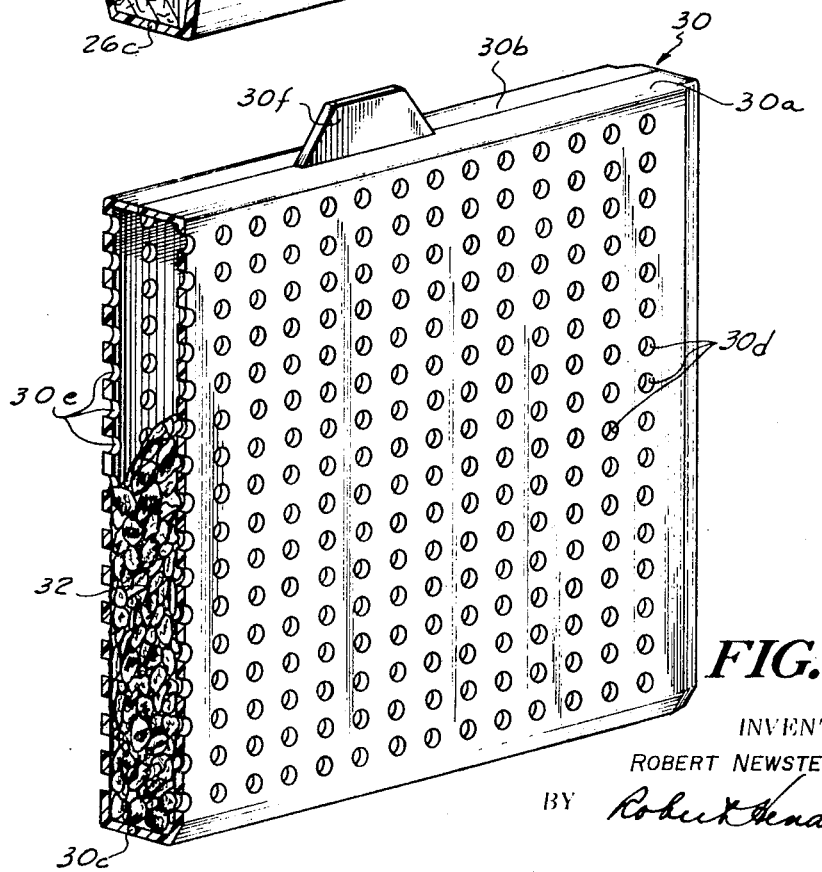
FIG. 8 is a perspective view of a large fragment of a second container for holding a purifying medium such as charcoal.

The water treating tank 10 is relatively narrow as compared to its width and height. At one end of the tank 10 is a water receiving compartment 16 into which water is delivered from the aquarium through a syphonal tube tube 18. At an intermediate part of the tank 10 is a filtering-purifying compartment 20 (hereinafter referred to for convenience merely as a "cleansing compartment") defined by opposite end walls 22, 24 holding between them a first container 26 filled with fibrous filtering material 28 (FIGS. 4 and 7) and a second container 30 filled with charcoal 32 (FIGS. 4 and 8). At the other end of the tank 10 is an aeration compartment 34 containing aeraflow of water to, through and from said tank.

The upright wall 22, separating the compartments 16 and 20, extends forwardly from and is substantially water tight with reference to a back wall 38 of the tank 10. The wall 22 terminates, at its front edge, a short distance from a front wall 40 of said tank, thereby defining, with said front wall, a rather narrow, vertical water passage 42 through which water flows from compartment 16 into compartment 20.

The upright wall 24, separating the compartments 20 and 34, extends rearwardly from and is substantially water tight with reference to the tank's front wall 40. The wall 24 terminates, at its back edge, a short distance from the tank's back wall 38, thereby defining, with said back wall, a rather narrow, vertical water passage 44 through which water flows from compartment 20 into compartment 34.

Because of the mentioned vertical, water passages, the flow of water through the tank 10 is substantially horizontal, pursuing a course into, through and from said tank substantially as indicated by arrows in FIG. 2.

It may be noted, particularly by reference to FIG. 4, that container 30 and the greater part, vertically, of container 26 are preferably quite thin and disposed in upright positions in intimate face-to-face relationship, but in spaced relationship to back and front walls 38 and 40, respectively, of the tank 10.

The just described arrangement leaves unobstructed water areas 46 and 48, in compartment 20, in front of container 26 and in back of container 30. These water areas are relatively narrow, but are broad in that they are wide and high. Thus, water moving from water area 46 to water area 48 pursues a very broad path through the relatively thin mass of fibrous material 28 in container 26 and through the relatively thin section of charcoal 32 in container 30. This is a highly efficient arrangement as the water suffers a minimum of impediment to its movement through the containers 26 and 30, yet the water is thoroughly purified.

The aeration means 36 are mounted in the aeration compartment 34 and in a generally cylindrical bubbling chamber 34a of said compartment which depends from the latter. A tube 50 connected at one end to and receiving air discharged from a suitable air pump 52 is connected at its other end to an external nipple 54 at the bottom of chamber 34a to force air through passage 56 of said nipple into said chamber.

The passage 56 extends through an internal nipple 58 upon which is fitted a depending collar 60a of a mount 60 for a porous stone 62 fitted upon a mounting nipple 60b of said mount. Air from the pump 52, issues from said stone in a myriad of bubbles which are confined substantially to upward movement by the generally cylindrical wall of the chamber 34a.

Air bubbles, rising from the stone 62 and from the upper end of the chamber 34a, are captured in a frusto-conical canopy 64, the lower edge of which is entirely clear of adjacent walls of the compartment 34 to permit water to move freely under said edge and into the canopy. The thus captured bubbles pass upwardly from the canopy and through an integral tube 66 and a separable tube 68 leading into the aquarium, below the level of the water therein. Water from the compartment 34 is entrained by the air bubbles and circulated into the aquarium and back into the subject water treating device as more fully hereinafter explained.

The canopy 64 and tube 66 are suitably supported by plural fingers 70 which extend upwardly from the mount 60 and are interconnected at their upper ends by a ring 70a which is firmly seated in back of (i.e. above) a circular, ridge 72 formed on the inside of the canopy. The fingers 70 and ring 70a are easily assembled with canopy 64 by merely pushing the assembly of fingers and their related ring 70a into the canopy; the resiliency of the canopy 64 being sufficient to enable the ring 70a to snap into place into locking association with the ridge 72.

It will be seen that the aeration means 36 may easily be removed bodily, for servicing, by merely separating tubes 68 and 66 and then grasping the latter tube to lift it, with the canopy 64, the fingers 70, and the mount 60 with the stone 62, from the aeration compartment 34. The aeration means 36 are just as easily replaced by a reverse operation.

The container 26, for holding the fibrous filtering material, may advantageously comprise a front-grid frame 26a and a back-grid frame 26d, preferably connected at adjacent bottom edges by a hinge 26c, permitting the two frames to be opened from the top to permit easy replacement of the fibrous material 28. A suitable catch (not shown) may be provided at the top of the container to releasably hold the two frames together.

Front grids 26d of the frame 26a and back grids 26e of frame 26b serve to hold the fibrous filtering material in the container 26, said material, however, being exposed to permit flow of water through the container, substantially horizontally, from front to back thereof.

The front grids 26d terminate at a level somewhat below the center of the frame 26a, said frame, below said grids, being open so that fibrous filtering material in the front of the lower part of container 26 constitutes a back wall of a deep, narrow catch basin 74 which extends forwardly, directly underneath the water area 46 wherein water is received, in the form of a narrow, vertical wall or sheet, from the compartment 16. The catch basin 74, thus, is in position to receive leaves or other solids or refuse settling from water in the area 46. The basin 74 has a front wall 74b which rests intimately against the front wall 40 of the tank 10. The catch basin has end walls 74c and, preferably, internal reinforcing ribs 74d.

The back grids 26e of the container 26, preferably, are more numerous and more closely arranged than the front grids 26d, and extend substantially over the entire area of the frame 26b.

As shown in FIG. 4, integral pins 26g, for supporting the fibrous material 28 against settling downwardly in the upright container 26, are advantageously provided, extending inwardly from grids 26d and from some of grids 26e, into the interior of the container 26. Said pins are preferably located at junctures of vertical and horizontal members of said grids, and said pins on the grids 26e, preferably, are disposed in staggered relation to said pins on the grids 26d. The fibrous material is loaded into the container 26 when the latter's two frames 26a and 26b are angularly separated. Then, when said frames are swung together, about hinge 26c, the pins 26g readily penetrate the fibrous material 28 and effectively hold the latter against settling within the container 26.

The charcoal container 30 comprises a front frame 30a, and a rear frame 30b, these frames being preferably connected at their bottom margins by a hinge 30c to enable them to be swung apart for replacement of charcoal. This container, also, may have a suitable catch (not shown) to releasably hold its two frames together.

The frames 30a and 30b are formed with arrays of numerous, suitable perforations 30d and 30e enabling water to pass horizontally through the container 30 and the charcoal therein.

Figure 5:
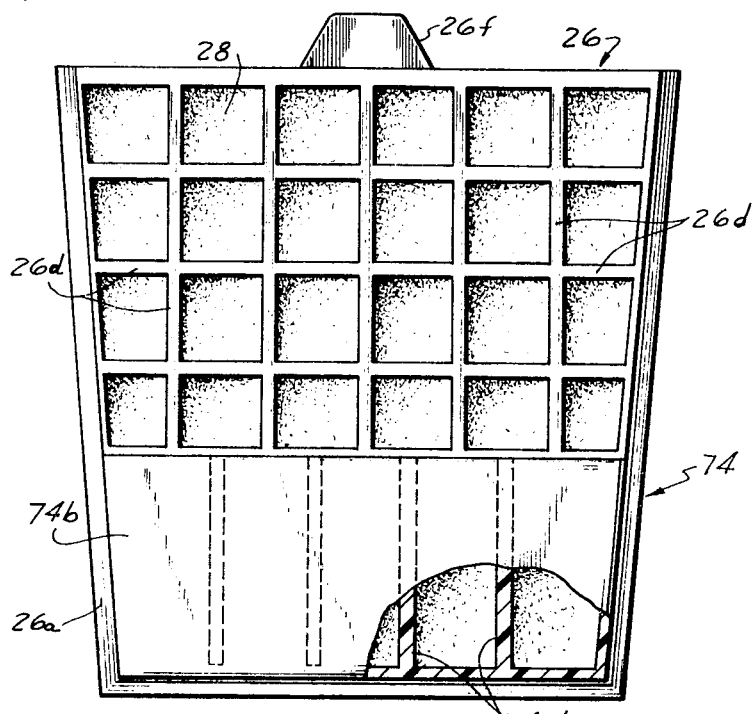
FIG. 5 is a front elevational view of a first container for holding fibrous filtering material; this container including a sediment receptacle located toward the bottom of its front face.
Figure 6:
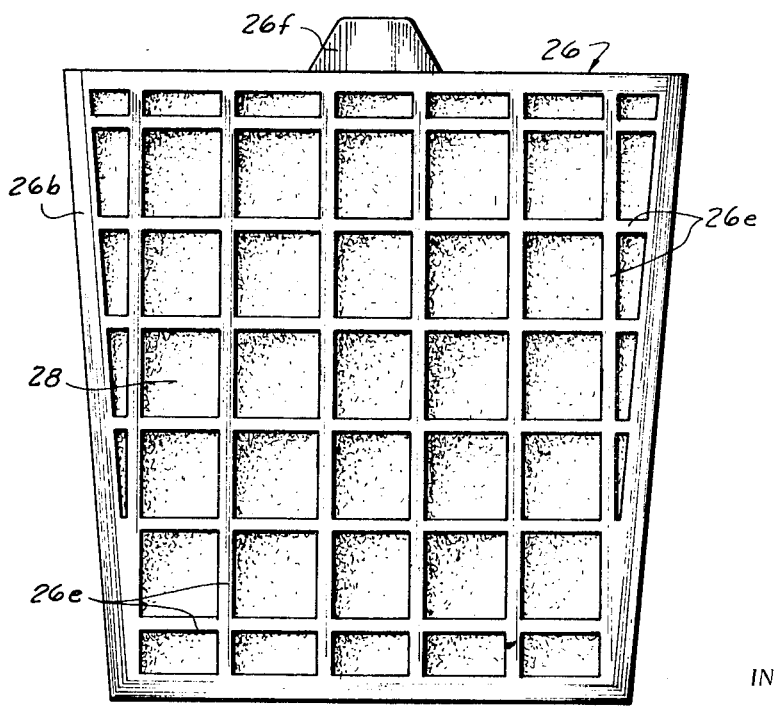
FIG. 6 is a back elevational view of said container.

It may be seen, from FIGS. 1 and 2, that the end walls 22 and 24 of the cleansing compartment 20 converge downwardly and, from FIGS. 1, 5 and 6, that container 26 similarly converges downwardly. Container 30 is of similar peripheral size and shape to container 26 and similarly converges downwardly. Said end walls 22 and 24 are formed with opposed, inner guide rails 76, 77, 78 (FIG. 2). The rails 76 and 77 form a pocket for receiving the container 30 and rails 77 and 78 form a pocket for receiving the container 26 in intimate face-to-face relationship to the container 30.

The containers 26 and 30 are preferably provided, respectively, with finger tabs 26f and 30f which can be grasped to enable the two said containers separately to be lifted easily from their said pockets for servicing; and said tabs also facilitate restoration of said containers to their related pockets; all without disturbing any other parts of the device.

OPERATION OF THE ILLUSTRATED DEVICE

The water level is the same in all compartments in the tank 10, and when or if the device is dormant, the water level is the same in the related aquarium. When the device is hung on the aquarium wall 12, the tube 18 is filled with water so that it will function as a syphon.

Operation of the air pump 52 is started and maintained to start and maintain operation of the present water treating device. This causes a continuing emission of air bubbles from the porous stone 62, the bubbles rising in bubbling chamber 34a and being guided upwardly by the canopy 64 into the tubes 66, 68, whence they enter the water in the related aquarium and rise to the surface of the water in the latter. The air bubbles, moving upwardly from the stone 62 into and through the tubes 66, 68, generate a flow of water from aeration compartment 34, and more particularly from the latter's bubbling chamber 34a, through the tubes 66, 68 into the aquarium.

This continuing movement of water tends to raise the water level in the aquarium, but, as the water seeks equilibrium in the aquarium and in the tank 10, water is syphoned from the aquarium into said tank's compartment 16 whence it moves horizontally in a thin vertical sheet through passage 42 into narrow vertical water area 46 in front of container 26 and directly above the latter's catch basin 74, into which solids in the water may settle.

Water, freed of much of the solids therein, moves from water area 46, horizontally and rearwardly through the containers 26 and 30, into a narrow vertical water area 48 in back of said containers. This water movement is through a broad area corresponding approximately to the areas of the contents of the containers 26 and 30. Hence, this water movement is in relatively large volume, and occurs with little opposition from the contents of said containers, while, nevertheless, efficiently filtering and purifying the water as it moves through said containers.

The vertical wall of water in water area 48 in back of container 30, then moves horizontally, through vertical water passage 44, into the aeration compartment and into the latter's bubbling chamber 34a. The air bubbles rising in the latter chamber continue to move the water back into the aquarium and to cause continuing recirculation of water through the subject water treating device to maintain continuing filtering, purifying, and aerating of the water in the aquarium. It is understood, of course, that the bubbles aerate the water.

It will be realized by those familiar with this art, that the device of this invention may be economically manufactured and is easily installed in relation to an aquarium, also, that the described catch basin opposes and defers clogging or deterioration of the filtering and purifying media, that the broadside movement of water through said media is very efficient, that the control of air bubble movement causes efficient aeration of the water, and that the containers 26 and 30, and the entire aeration means 36 may easily be removed, serviced, and replaced.

It will be understood that the inventive concepts disclosed herein may be utilized in various other ways without, however, departing from this invention as set forth in the following claims.

I claim:

1. A water treating device for treating water in an aquarium, comprising a tank, operatively disposable externally of the aquarium at a height at which water within said tank may be maintained at approximately the same level as water in the aquarium, upright, broad, and relatively thin, water permeable, container means for holding different water treating substances in vertical masses in side-by-side relationship, said container means and a nearby wall of said tank defining a water input area at one broad side of said means from which area water moves horizontally to and through said means, said container means and another nearby wall of said tank defining a water output area at the opposite broad side of said means for receiving treated water from the latter; and said tank having a water receiving compartment, a water cleansing compartment communicating with said water receiving compartment through a relatively narrow, upright, first water passage, and a water aerating compartment communicating with said water cleansing compartment through a relatively narrow, upright, second water passage; said container means being disposed in said water cleansing compartment.

2. A device according to claim 1, substantial portions of all said compartments being in horizontal alignment to provide for approximately horizontal movement of water through said tank.

3. A device according to claim 1, said water aerating compartment being formed with a generally cylindrical, vertical-axis, bubbling chamber as a lower part thereof; said chamber being provided with an air inlet element in the bottom thereof, an air discharging element, separably mounted on said air inlet element, a bubble-receiving canopy in said compartment positioned clear of the latter's walls, above and in vertical alignment with said chamber, plural, upright fingers interconnecting said air discharging element and said canopy, and tubing affording water communication between water under said canopy and water in a related aquarium.

4. A device according to claim 3, further including a porous stone mounted upon said air discharging element for dispersing air, in a myriad of bubbles, toward said canopy.

5. A water treating device for treating water in an aquarium, comprising a tank adapted for disposition outside of said aquarium and comprising a water cleansing compartment provided with relatively broad and relatively thin, upright, water permeable water treating means which partially define, at one broad side thereof, a water input area, communicating, through a first, narrow, upright water passage, with a water receiving compartment which has a syphonal water connection to said aquarium, and which means partially define, at an opposite broad side thereof, a water output area, communicating, through a second, narrow, upright water passage, with a water aerating compartment having water aerating means therein, and a tubular water connection to said aquarium; all said compartments being substantially in horizontal alignment, whereby water moves substantially horizontally through the tank for treatment.

6. A water treating device for treating water in an aquarium, comprising a tank, operatively disposable externally of the aquarium at a height at which water within said tank may be maintained at approximately the same level as water in the aquarium, upright, broad, and relatively thin, water permeable, container means for holding different water treating substances in vertical masses in side-by-side relationship, said container means and a nearby wall of said tank defining a water input area at one broad side of said means from which area water moves horizontally to and through said means, said container means and another nearby wall of said tank defining a water output area at the opposite broad side of said means for receiving treated water from the latter; said container means comprising an upright, relatively thin and quadrangularly broad container partly defining said water input area; fibrous water treating material being disposed in said container, and opposite broad sides of said container being water permeable; said container comprising, also, an integral catchbasin at the bottom of said container and located below said water input area; the container, with its catchbasin, being vertically removable to permit cleaning of the catchbasin and replacement of the fibrous material.

References Cited

UNITED STATES PATENTS

| 2,652,151 | 9/1953 | Lagus. | |
| 2,663,431 | 12/1953 | Clarke | 210—231 |
| 3,377,991 | 4/1968 | Rubert | 210—169 X |
| 2,182,501 | 12/1939 | Quaue et al. | 210—232 X |

REUBEN FRIEDMAN, Primary Examiner

T. A. GRANGER, Assistant Examiner

U.S. Cl. X.R.

119—5

UNITED STATES PATENT OFFICE

CERTIFICATE OF CORRECTION

Patent No. 3,513,978                                                    May 26, 1970

Robert Newsteder

It is certified that error appears in the above identified patent and that said Letters Patent are hereby corrected as shown below:

Column 2, between lines 54 and 55 insert -- tion means 36 which also serve to induce and maintain the --.

Signed and sealed this 5th day of January 1971.

(SEAL)
Attest:

Edward M. Fletcher, Jr.                                    WILLIAM E. SCHUYLER, JR.
Attesting Officer                                                     Commissioner of Patents